United States Patent
Wettermann et al.

(10) Patent No.: US 9,339,014 B1
(45) Date of Patent: May 17, 2016

(54) RETRACTABLE LEASH WITH GRADUAL BRAKING

(71) Applicants: Marc H L Wettermann, Portland, OR (US); Brandon B Reynolds, Greenville, NY (US); Richard Thomas, El Paso, TX (US)

(72) Inventors: Marc H L Wettermann, Portland, OR (US); Brandon B Reynolds, Greenville, NY (US); Richard Thomas, El Paso, TX (US)

(73) Assignees: Richard Thomas, El Paso, TX (US); Brandon B. Reynolds, Medford, NY (US)

( * ) Notice: Subject to any disclaimer, the term of this patent is extended or adjusted under 35 U.S.C. 154(b) by 151 days.

(21) Appl. No.: 14/468,923

(22) Filed: Aug. 26, 2014

(51) Int. Cl.
   *A01K 27/00* (2006.01)
   *B65H 75/34* (2006.01)

(52) U.S. Cl.
   CPC .................................. *A01K 27/004* (2013.01)

(58) Field of Classification Search
   CPC ... A01K 27/00; A01K 27/004; A01K 27/003; B65H 75/4431; B65H 75/4423
   USPC .......................... 119/796, 797, 798, 795, 792
   See application file for complete search history.

(56) References Cited

U.S. PATENT DOCUMENTS

| | | | |
|---|---|---|---|
| 4,488,511 A | 12/1984 | Grassano | |
| 5,423,494 A | 6/1995 | Kondo | |
| 6,695,101 B1 | 2/2004 | Wang | |
| 6,845,736 B1 | 1/2005 | Anderson | |
| 2004/0237907 A1* | 12/2004 | Muller | B65H 75/4431 119/796 |
| 2011/0180017 A1* | 7/2011 | Goldenberg | B65H 75/4431 119/796 |
| 2011/0220036 A1 | 9/2011 | Matthews | |
| 2011/0239956 A1 | 10/2011 | Bogdahn | |
| 2012/0006284 A1* | 1/2012 | Messner | A01K 27/004 119/796 |
| 2012/0073516 A1 | 3/2012 | Ek | |
| 2012/0234959 A1* | 9/2012 | Christianson | A01K 27/004 242/396.1 |
| 2013/0200197 A1* | 8/2013 | Bogdahn | A01K 27/004 242/396 |
| 2014/0238314 A1* | 8/2014 | O'Brien | A01K 27/004 119/796 |
| 2015/0237832 A1* | 8/2015 | O'Brien | A01K 27/004 119/796 |

* cited by examiner

Primary Examiner — Trinh Nguyen
(74) Attorney, Agent, or Firm — Peter Loffler

(57) ABSTRACT

A retractable pet leash system allows a pet to vary its distance from the leash system, with the system paying out additional leash as needed, and when not needed, automatically retracting the leash back into the system. If at any time a user desires to halt further payout of leash, the user presses a button that causes the leash to be pressed against a frictional element that causes braking of leash payout at a gradually increasing rate while simultaneously, a lever lockably engages the spool preventing further rotation of the spool in the payout direction.

10 Claims, 5 Drawing Sheets

RETRACTABLE LEASH WITH GRADUAL BRAKING

BACKGROUND OF THE INVENTION

1. Field of the Invention

The present invention relates to a retractable pet leash that has a user controlled brake wherein the braking action generated by the brake decelerates, at a gradually increasing rate, the payout of the leash from a leash housing in order to help prevent undue discomfort and injury to a pet using the leash.

2. Background of the Prior Art

Pets, especially dogs, need to be taken outside regularly and allowed to walk or run in order for the dog to do its business as well as to give the dog some exercise and fresh air. While some pet owners have the luxury of allowing their dog to run free, such as dogs on a farm, most dog owners must walk the dog with the dog in close proximity to the owner. Some dogs can be walked independently, that is without being tethered to the dog walker via a leash, however, many other dogs must be walked on a leash. The requirement for a leash is multifold. Many jurisdictions, or even housing neighborhoods have mandatory leash laws requiring dogs, even the smallest of dogs, to be on a leash at all times while outdoors. Such dog walkers place their dog on a leash lest they run afoul of their neighbors or law enforcement. Other dogs are leash walked for the protection of the dog. A dog, even a well-disciplined dog, walking down a busy street may become distracted or otherwise desire to bolt from its owner for a variety of reasons. But for the leash, the dog may run into traffic and be hurt or killed, not to mention the potential for a traffic accident as a driver serves to try and avoid hitting the animal. Some dogs, especially larger dogs are leashed for the protection of others. Even the friendliest of dogs can bite others, such as small children who believe that poking a dog in the eye is great fun. Leashing the dog allows the owner to maintain the dog a safe distance from potential bite victims of the dog.

There are two broad categories of leashes currently being used for dog walking (and cat walking for the brave). The fixed length leash is a single length tether that typically has a handle on the dog walker's end, and a clip on the opposing end that clips onto an appropriate receiver of a collar that encircles a dog's neck. The leash is clipped onto the dog's collar, the walker grasps the handle and the walk or run commences. Tried and true, such leashes find favor with many dog owners. While effective, such leashes are not without their drawbacks. The fixed length nature of the leash does not permit the animal to venture far from its handler. Although this limitation may prove satisfactory in many situations, often the dog desires to venture a bit further from its owner than can be accommodated by such a leash. For example, on a quiet neighborhood street when the handler decides to stop and chat with a neighbor, the dog may want to sniff some trees beyond the reach of the leash. Often, in such situations, the dog may repeatedly try to tug on the leash in order to venture beyond the travel limits of the leash, which repeated tugging is uncomfortable on dog and handler alike. Additionally the leash can become entangled within either the dog's or the handler's legs, especially in longer length fixed length leashes, creating a potential hazard.

To address the limitations of fixed length leashes, variable length leashes have been proposed. These leashes have a housing that has a spool therein, about which the leash is wound. The housing has a handle for ease of holding while the distal end of the leash has the typical clip thereon for clipping the leash onto the dog's collar. When the dog is clipped to the leash and begins to walk and thus move away from the housing, the leash is paid out from the housing, being unwound from the spool. The length of such leashes is usually much longer than a typical fixed length leash allowing the dog to venture farther compared to the fixed length leash. When the dog ventures back toward the leash housing, the leash is retracted back into the housing and wound back about the spool, usually automatically in some appropriate spring-loaded architectures, although some manual rewind systems exist wherein the handler rewinds the leash onto the spool by turning an appropriate crank. Such systems have locks that lock the leash in a fixed length so that if the handler wants the dog at a fixed distance from the handler, for example on a busy street wherein the dog must remain close to the side of the handler, once the desired length of leash is paid out from the housing, a lock is set fixing the length of the leash, the leash cannot neither get longer nor shorter while so locked. Many systems allow the handler to either temporarily hold the leash in this fixed length by maintaining pressure on the brake, or to hold the leash in this fixed length indefinitely by placing the brake into a locked position. This type of leash, while more expensive than a typical fixed length leash, allows a dog to have more independence during a typical walk, while allowing the handler to maintain tight control of the dog when the situation warrants.

While favored by many dog owners, variable length leashes are not without their drawbacks. One of the chief problems with these types of leashes centers on the situation when the owner must suddenly terminate further payout of the leash from the spool. For example, when the dog suddenly darts toward another person walking down the street, the handler needs to terminate further advancement of the dog in order to prevent the other person from becoming scared or injured. To halt further payout of the leash, and thus advancement of the animal, the handler throws the device's brake, locking the spool.

The problem with this braking is that the payout suddenly stops, halting the animal in its tracks. If the dog is running at full stride, suddenly braking the leash to a halt can not only be quite painful, it can also result in injury to the animal. To address these problems, many retractable leash systems have brakes that gradually decelerate under a sudden stop so that the animal is stopped gradually as opposed to suddenly. These systems, which come in a wide variety of architectures and work with varying degrees of efficiency, help prevent discomfort and injury to the animal. However, such systems are not without their drawbacks.

Some systems are relatively simple and place a resilient section of leash at the distal end of the leash in order to act as a deceleration spring. When the leash is suddenly halted due either to braking by the handler, the resiliency of this section of the leash slows the animal down gradually. The problem with these types of deceleration systems is that the resilient portion of the leash must be relatively thin in order to approximate the thickness of the remainder of the leash to assure the leash's proper operation. As such, if the animal pulls hard on the leash, the resilient portion, by being relatively thin, will have a relatively low spring constant, allowing the leash to be stretched relatively far. Once the resilient portion is stretched to its outer limit, this portion snaps back under its spring action. This snap back is uncomfortable to animal and handler alike, and can result in the animal stumbling from this unexpected reversal of course. Still other systems use a step brake deceleration system that has a brake latch contact and ride over several one way ramps before finally becoming ensnared by such a ramp and halting spool unwind. This type of system causes a bumpy and jagged deceleration which is very uncomfortable to animal and handler alike. Still other systems are unusually complex in design and construction so as to make such systems relatively expensive to produce. Additionally, the complexity of such systems increases the potential for failure of the device resulting in the need to repair the device or replace the device.

What is needed is retractable leash that has gradual deceleration of the leash when payout is halted due to the handler engaging the brake of the device, which retractable leash overcomes the above stated shortcoming found in the art. Specifically, such a retractable leash must be able to gradually decelerate the leash payout so as to help prevent discomfort and injury to the dog, and possibly the handler, in a smooth efficient manner. The retractable leash must not have a sudden rapid snap back of the leash whenever the animal's progress is halted due to leash braking. The gradual deceleration of the retractable leash must be smooth, not bumpy or jagged. The retractable leash must be of relatively simple design so as to be relatively easy to produce and maintain.

SUMMARY OF THE INVENTION

The retractable leash with gradual braking of the present invention addresses the aforementioned needs in the art by providing a typical retractable type of leash that has a spool held within a housing about which a leash is wound such that the leash is paid out of the housing when needed and is automatically retracted back into the housing and wound back about the spool when not needed. The retractable leash with gradual braking has a user controlled brake that allows further leash payout from the housing to be stopped which brake decelerates the leash payout at a gradually increasing rate. During leash payout deceleration, the braking is smooth and the leash does not experience a sudden snap back once halted. The retractable leash with gradual braking is of relatively simple design and construction, being produced using standard manufacturing techniques, thereby making the device relatively inexpensive to produce and maintain so as to make the device economically attractive to potential consumers for this type of device.

The retractable leash with gradual braking is comprised of a leash housing that has a spool rotatably disposed therein. A lock lever is pivotally disposed within the housing. The lock lever articulates between a normally relaxed first position wherein the lock lever is disengaged from the spool and a second position wherein the lock lever is engaged with the spool and prevents the spool from rotation but does not prevent spool counter-rotation. A friction element is disposed within the housing. An engagement cam has a base and a top and a central opening therebetween such that the engagement cam straddles the friction element such that the friction element is located within the central opening. The engagement element articulates between a normally relaxed third position wherein a top end of the friction element abuts the top of the engagement cam and a fourth position wherein the base of the engagement cam abuts a rounded bottom of the friction element. When the lock lever is in the first position, the engagement cam is in the third position and as the lock lever articulates toward the second position, the lock lever urges the engagement cam toward the fourth position and as the lock lever returns back toward the first position, the engagement cam returns, in lockstep, back toward the third position. A tether is wound about the spool and is retractably paid out through an opening on the housing. The tether passes through the engagement cam such that when the lock lever is in the first position and thus the engagement cam is in the third position, the tether passes along the base of the engagement cam and does not engage the friction element. As the lock lever is moved toward the second position, thereby urging the engagement cam toward the fourth position, the base of the engagement cam moves a portion of the tether into frictional engagement with the bottom of the friction element, the frictional engagement increasing as the engagement cam moves toward the fourth position and with decreasing frictional engagement as the engagement cam moves toward the third position, the tether being disengaged from the friction element whenever the engagement cam is in the third position. A spring having a spring constant is attached to the spool and to the housing in order to spring-load the spool so that pay out of the tether from the housing operates against the bias of the spring, thereby allowing automatic refraction of the tether back onto the spool via the spring-loading. The spring constant of the spring is adjustable. A spring-loaded button is disposed within housing and abuts the lock lever such that button articulates between a normally relaxed fifth position wherein the lock lever is in the first position and a sixth position wherein the button urges the lock lever into the second position such that the spring-loading of the button attempts to urge the button toward the fifth position. A stop is disposed within the housing such that the button is removably placed against the stop in order to hold the button in the sixth position against the spring-loading of the button. A plurality of equidistantly spaced teeth is located on an outer surface of the spool and arranged in a circle, such that each tooth has a first side with a one-way ramped surface and a second side with a stop surface (flat to slightly curved) such that whenever the spool is rotating in the direction of tether pay out, the second side of each tooth is the leading edge and such that whenever the lock lever is in the second position, the lock lever engages the second side of one of the teeth and thereby prevents the rotation of the spool in a tether pay out direction, yet when the spool rotates in a counter direction, the lock lever (in the second position) rides overtop the first side of each tooth. The base of the engagement cam has a pair of ends and a curved medial portion. The shape of the curved medial portion corresponds to the shape of the lower end of the friction element such that this lower end is received within the curved medial portion with the tether sandwiched therebetween, whenever the engagement cam is in the sixth position. The housing has a handle.

BRIEF DESCRIPTION OF THE DRAWINGS

Similar reference numerals refer to similar parts throughout the several views of the drawings.

DESCRIPTION OF THE PREFERRED EMBODIMENT

Figure 1:
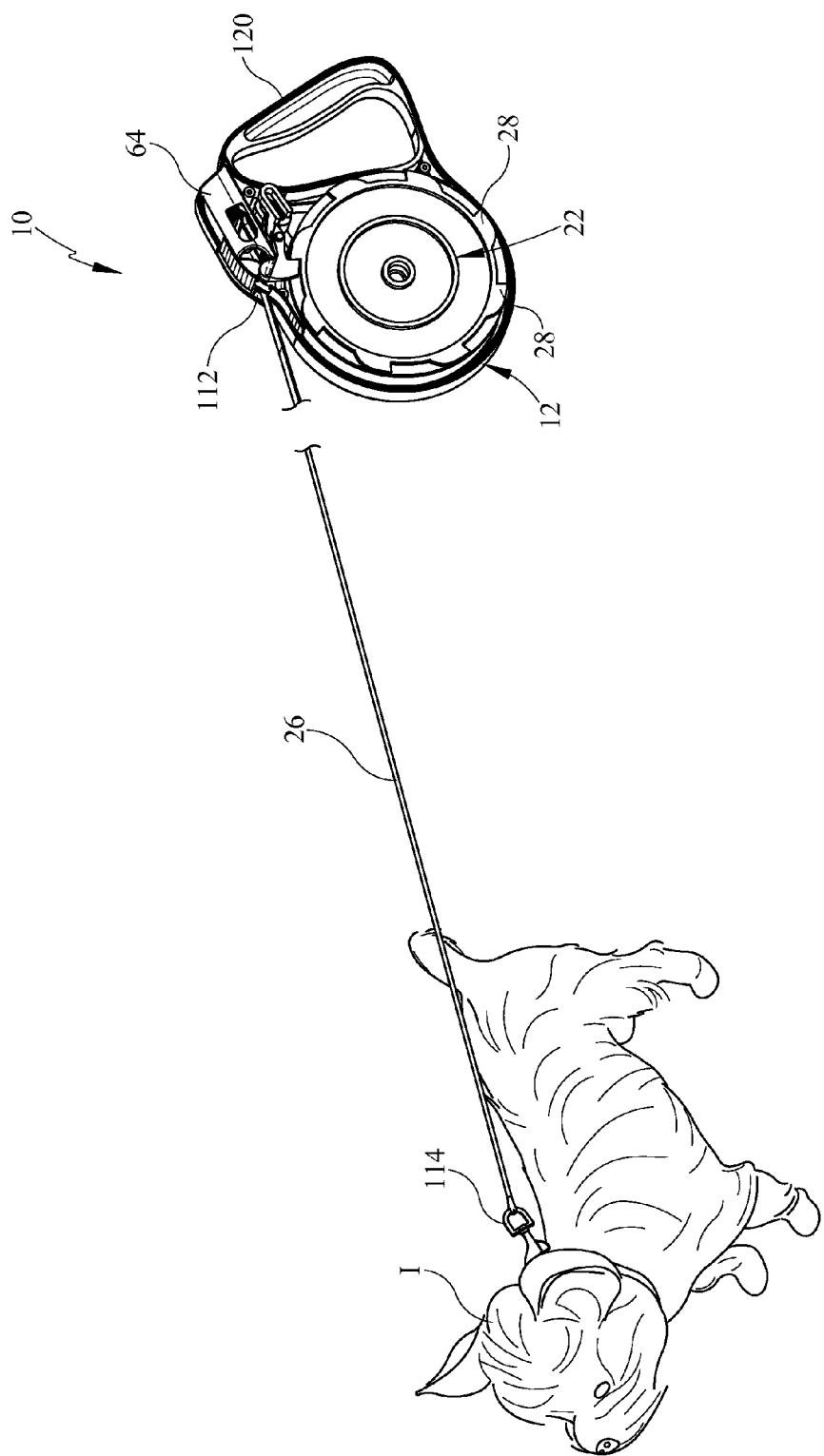
FIG. 1 is an environmental view of the retractable leashing with gradual braking of the present invention with the cover removed to illustrate the interior mechanics.

Referring now to the drawings, it is seen that the retractable leashing with gradual braking of the present invention, generally denoted by reference numeral 10, is comprised of a main housing 12 and a corresponding cover 14 that correspondingly attaches, either fixed (adhesive, ultrasonically welded, etc., or removably, screws, etc.,) to the housing 12. The main mechanical components of the retractable leashing with gradual braking 10 are held within the housing 12 and attached cover 14. The housing 12 and its cover 14 are made from an appropriate material, such as plastic.

As seen, the housing 12 has a generally circular area 16 that has a centrally located post 18 thereat, the post 18 having a hollow central cavity 20. A spool system is rotatably disposed within the circular area 16 and is capable of rotating and counter-rotating therein. The spool system comprises a spool 22 that has a central channel 24 upon which a tether 26 is wound. A series of ramped teeth 28 are circumferentially located on each side of the spool 22, each tooth 28 on one side of the spool 22 aligned with a corresponding tooth 28 on the opposing side of the spool 22, each tooth 28 spaced equidistantly from its adjoining teeth 28. A central inner opening 30 is located on the spool 22, such that a coil mount 32 has a first end 34 fixedly secured to a surface of the central inner opening 30 and a second end 36 that is free and may have a small lip 38 thereon. A coiled leaf spring 40 has a small loop 42 on its outer end that is mounted onto the coil mount 32, the lip 38 of the coil mount 32 helping hold the leaf spring 40 thereon. As such, the leaf spring 40 occupies the central inner opening 30. A coil spring 44 is disposed within the cavity 20 of the post 18. An adjustment knob 46 has a hollow central core 48 with a longitudinal slit 50. A plate 52 is located at the top of the core 48 with a stub 54 extending outwardly from the plate 52 and a finger grip 56 extending from the stub 54. Circumferentially located about the plate 52 and encircling the stub 54 are a series of one way ramps 58, each ramp 58 spaced equidistantly from its adjoining ramps 58. As seen, the cover 14 has a central opening 60. Circumferentially located about the central opening 60, on the inner facing surface of the cover 14, are a series of ramp receivers 62 that are dimensioned to receive the ramps 58 of the adjustment knob 46.

In order to assemble the spool system, the leaf spring 40 has its loop 42 fitted onto the coil mount 32 and the spool 22 is placed into the circular area 16 of the housing 12. The coil spring 44 is placed into the cavity 20 of the post 18. The adjustment knob 46 is inserted into the central inner area of the leaf spring 40 such that a portion of the leaf spring 40, proximate its inner end, passes through the slit 50 of the central core 48. Thereafter the cover 14 is affixed to the housing 12 in appropriate fashion. In this position, the stub 54 of the adjustment knob 46 protrudes through the central opening 60 of the cover 14. The ramps 58 on the adjustment knob 46 are each received within a respective one of the ramp receivers 62 on the cover 14, with the coil spring 44 biasing against the housing 12 and against the plate 52 in order to maintain the adjustment knob 46 in this position. The adjustment knob 46 is used to adjust the tension of the leaf spring 40 as more fully explained below.

Looking now to FIGS. 1-4, the brake mechanism comprises a push button 64 that has a body with a central opening 66, an outer wall 68, and a pair of extension arms 70 extending outwardly from the body 64 on an end opposite the end bearing the outer wall 68, each extension arm 70 being generally flat on its lower side and upwardly curved on its upper side. A spring post 72 is fixedly secured to the housing 12 such that the spring post 72 passes through the central opening 66. A push button spring 74 has one end biased against the spring post 72 and an opposing end biased against the outer wall 68 of the push button 64, thereby spring-loading the push button 64. A cam 76 and a lock lever 78 are each pivotally attached to the housing 12 via a pivot pin 80 with the lock lever 78 straddling the cam 76, with the cam 76 connected to the lock lever 78 so that the two elements 76 and 78 rotate in lockstep. The upper end of the cam 76 is rotatably connected to the extension arms 70 via a pin 82. As seen, the lock lever 78 is comprised of a pair of identical lever arms 84 that each extend from the pivot pin 80 and terminate in a head 86. Each head 86 has an outwardly rounded top 88 and backside 90 and a flat or slightly inwardly curved front side 92 and bottom 94. A teardrop shaped friction element 96 is attached to the housing 12 while an engagement cam 98 has a body 100 that has an outwardly rounded bottom 102 with a inwardly rounded upper surface 104 and a pair of spaced apart arched elements 106 coextend upwardly from the body 100 such that a connector 108 connects the two arched elements 106 at their tops. The engagement cam 98 is connected to the housing 12 via an arm 110 that has one end pivotally attached to the body 100 and the opposing end pivotally attached to the housing 12.

Figure 2:
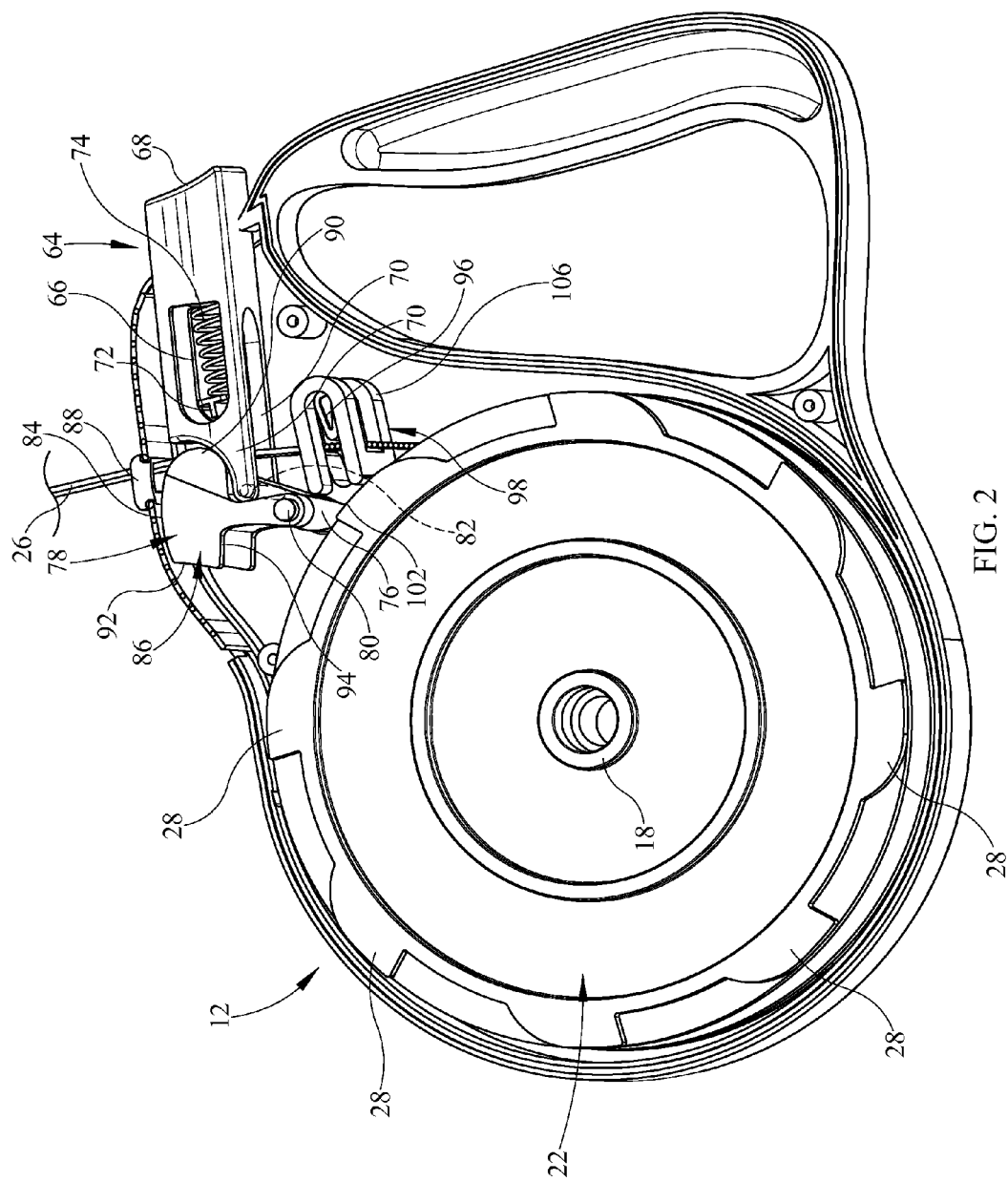
FIG. 2 is a perspective view of the retractable leashing with gradual braking with the cover removed to illustrate the interior mechanics, the device in an initial, ready to use position.
Figure 3:
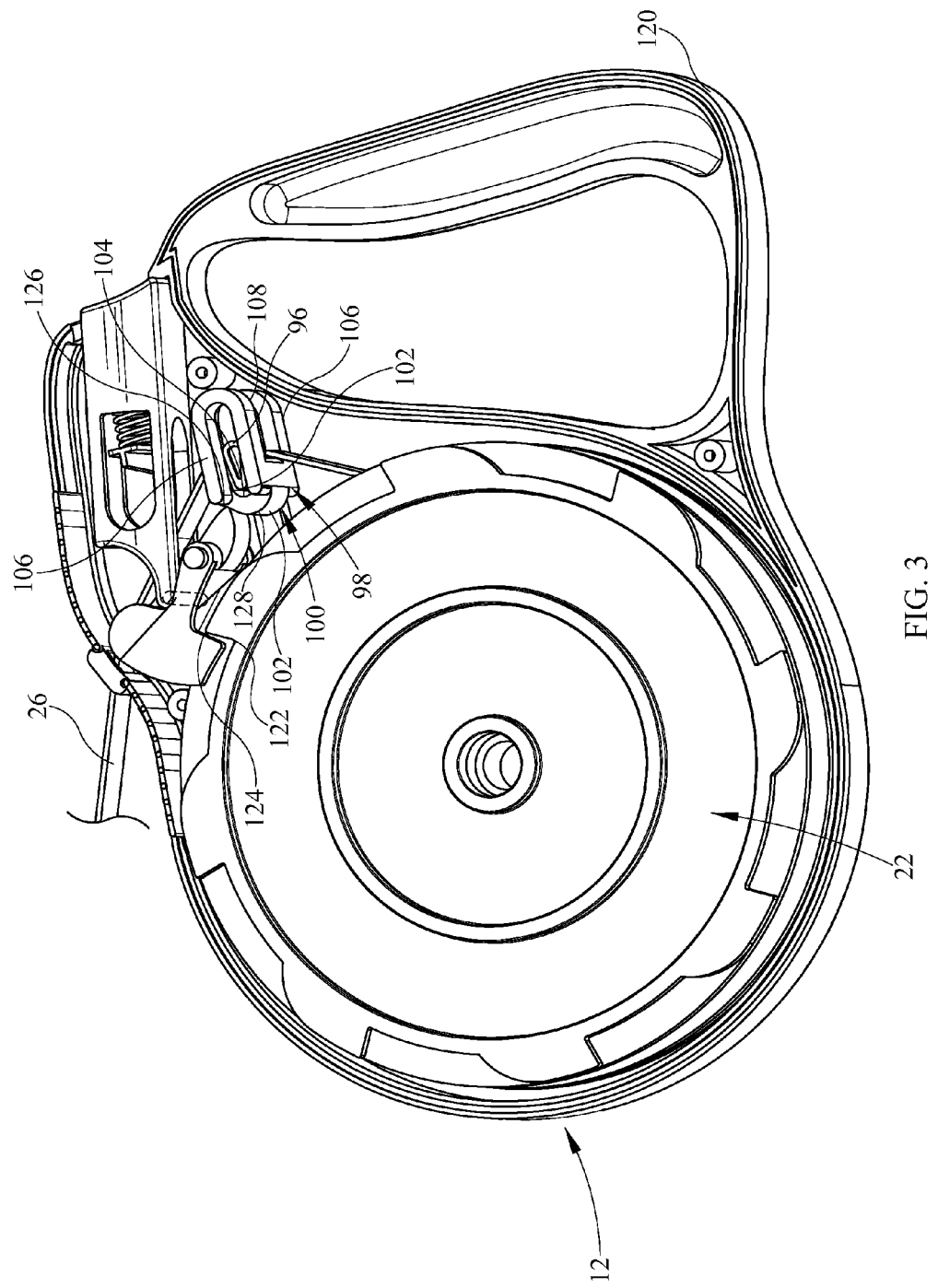
FIG. 3 is a perspective view of the retractable leashing with gradual braking with the cover removed to illustrate the interior mechanics, the device in a latched position.
Figure 4:
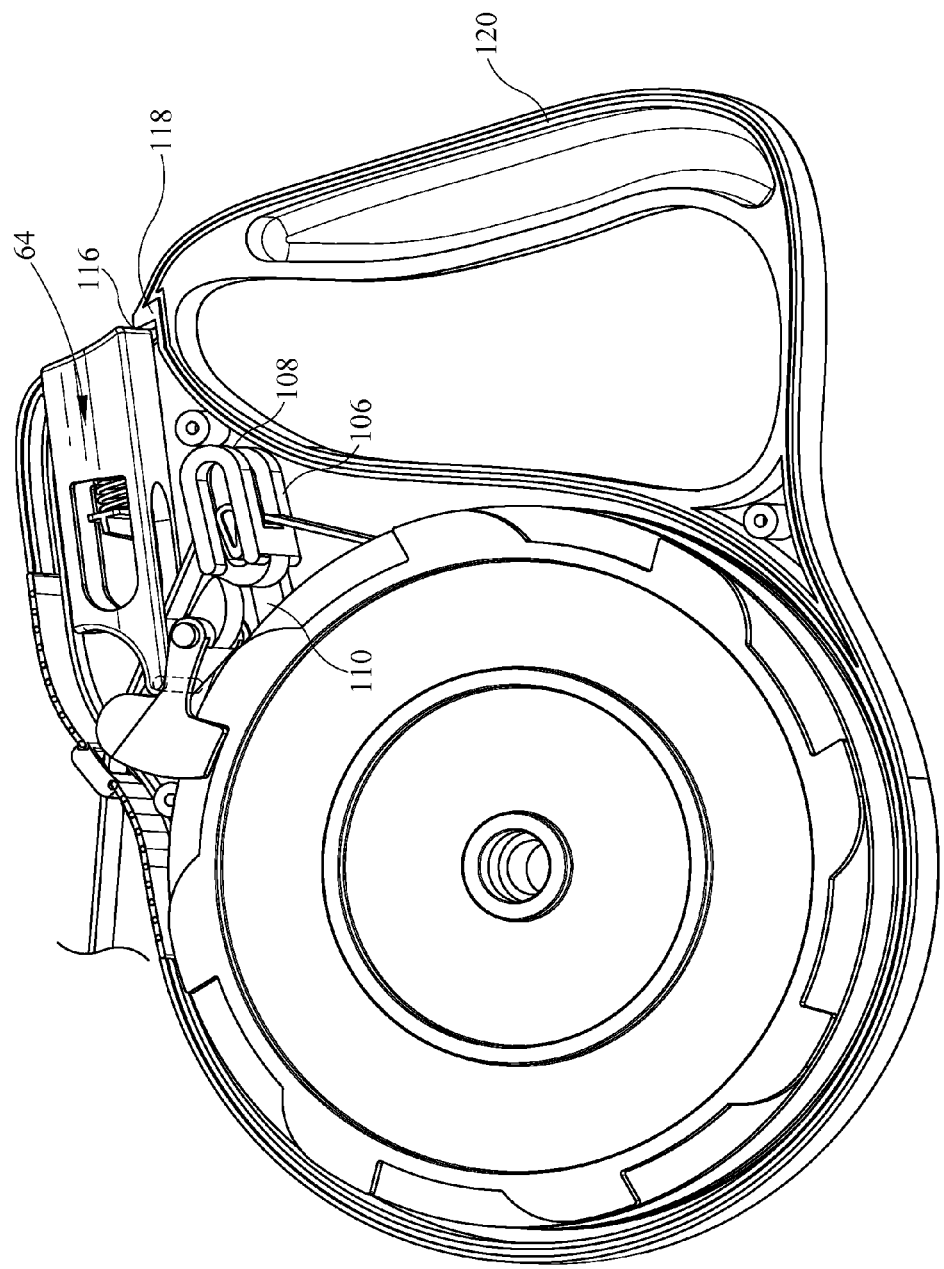
FIG. 4 is a perspective view of the retractable leashing with gradual braking with the cover removed to illustrate the interior mechanics, the device in a locked position.
Figure 5:
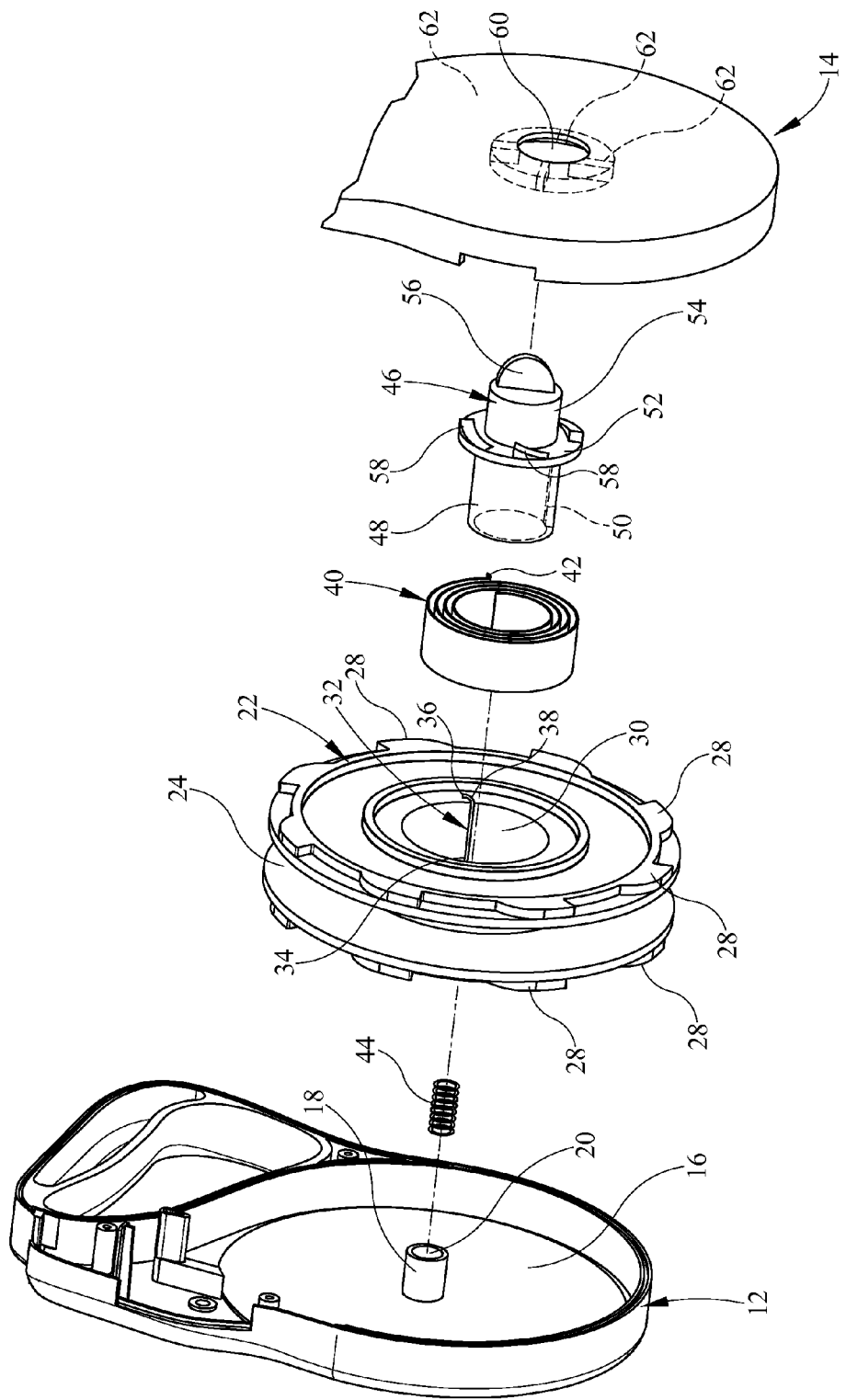
FIG. 5 is an exploded perspective view of the adjustment knob mechanism used to adjust the spring tension of the spool.

In order to use the retractable leashing with gradual braking 10 of the present invention, the tether 26 is wound about the spool 22 and connected thereto in the usual way with the tether 26 extending out from the housing 12 through an appropriate opening 112 on the housing 12. The distal end of the tether 26, which may have an appropriate clip 114 or other attachment device thereon, is attached to the animal I in the usual way and the animal I can be walked in normal fashion, the user grasping the retractable leashing with gradual braking 10 via a handle 120. When the retractable leash with gradual braking 10 is in the initial position, as seen in FIG. 2, the push button 64 extends outwardly from the an opening 116 in the housing 12 biased in such position by the push button spring 76 and limited in its extension by the cam 76. The tether 26 passes over the upper surface 104 of the body 100 of the engagement cam 98 and pulls the body 100 downwardly so that upper larger rounded end of the friction element 96 biases against the connector 108 of the arched elements 106. In such position, the tether 26 experiences no contact and thus no friction from the frictional element 96 and little to no contact with the body 100 and thus little to no friction therefrom. As the animal I moves away from the retractable leashing with gradual braking 10, spool 22 rotates in order to allow more tether 26 to be paid out from the housing 12. As the spool 22 rotates, the leaf spring 40 is further coiled thereby spring-loading the spool 22. When the animal I moves toward the housing 12, the spool 22, via the spring bias of the leaf spring 40, counter-rotates thereby retracting the tether 26 back into the housing 12 and winding the retracting tether 26 about the spool 22. If the animal moves sufficiently far away from the housing 12 so as to fully unwind the tether 26 from the spool 22, further movement away from the retractable leashing with gradual braking 10 causes increased coiling of the leaf spring 40, until the animal I can no longer further coil the leaf spring 40 resulting in a stop. As the braking action is due to a leaf spring 40 as opposed to a coil spring or its equivalent, the braking is gradual, not sudden, and any retraction that may occur, is both slight and gradual.

If the user desires to stop the animal I when the animal I is moving away from the housing 12—for example, the animal I is about to run into a busy street—the user pushes the push button 64 inwardly into the housing 12. As the push button 64 is being pressed inwardly, the top of the cam 76, being connected to the extension arms 70, rotates such that the bottom of the cam 76 pushes against the rounded bottom 102 of the body 100 of the engagement cam 98 pushing the engagement cam 98 generally away from the spool 22. This causes the outer edges of the upper surface 104 of the body 100 to engage the tether 26 and push the tether 26 the friction element 96, eventually pushing the rounded upper surface 104 of the body 100 into the relatively narrow bottom of the friction element 96 with the tether 26 sandwiched therebetween in a generally "W" shaped configuration. This action causes the upper surface 104 to exert increasing friction on the tether 26 and eventually for the friction element 96 to also exert friction on the tether 26. This increased friction on the tether 26, makes movement of the tether 26 in either direction increasing difficult, resulting in deceleration of tether 26 pay out (or refraction) for a given force, such as for the animal I running at a constant speed. As the frictional engagement by the upper surface 104 of the body 100 as well as the frictional element 96 upon the tether 26 is gradual, increasing with increased inward push button 64 movement, the braking action performed by such frictional engagement is also gradual, resulting in a more gradual and controlled stop of the animal's movement. Simultaneously, as the push button 64 is being pushed inwardly, the lock lever 78 rotates toward the spool 22 until the forward end of the head 86 is in the path of the teeth 28 of the spool 22. The flat surface of the teeth 28 engage the bottom 94 of the head 86 thereby preventing further rotation of the spool 22 in the payout direction. The push button 64 can be held in one of two positions. In a latched position, illustrated in FIG. 3, the bottom surface 94 of the head 86 engages the flat side of one of the teeth 28, however, the head 86 is not fully seated within the gap between the teeth 28. The push button 64 is angled somewhat upwardly with the outer wall 68 of the push button 64 facing a lip 118 on the housing 12, but not necessarily engaging it. For the push button 64 to be in the latched position, the user holds the push button 64 in this configuration via his or her thumb. In the latched position, the spool 22 is not free to rotate in a tether payout direction. The user can then place the push button 64 into the locked position, illustrated in FIG. 4, by simply releasing the push button 64 so that the outer wall 68 of the push button 64 engages the lip 118 on the housing 12 biased thereagainst by push button spring 74. This causes the push button 64 to lose its slight upwardly angling so that the head 86 of the lock lever 78 is now fully seated within the gap between two teeth 28. The user can release the push button 64 from its locked position by pushing the push button 64 via its outer wall 68 slightly inwardly and thereafter pushing on the outer wall 68 slightly upwardly so that the push button 64 clears the lip 118 on the housing 12 and partially exits the housing 12 under the bias of the push button spring 74, returning back to the initial position wherein the spool 22 is free to rotate and counter-rotate.

When the lock lever 78 passes the corner 122 of the tooth 28 at the non-curved side of the tooth 28 on its way to the base 124 of the tooth 28, the arched element 106 of the friction element 98 has reached its furthest position, so the contact surface on the arched element 106, between free points 126 and 128 (slight curvature of the arched element between these two points) is such that the lock lever 78 can move freely between the corner and the base of the tooth 28 without changing the position of the friction element. Without this curvature and free movement of the friction element 98, the lock lever 78 would latch before the friction element 98 had fully engaged, or the friction element 98 cam would already be fully engaged and prevent the lock lever 78 from moving past the corner of the tooth 28 and possibly cause mechanical failure.

It is also noted that the curvature of the surface arched element 106 from contact point 128 back to its initial contact position is shaped such that for each degree of rotation of the lock lever 78 (starting from its initial position), the distance the friction element 98 moves increases at an increasing rate. In other words, this curved surface of the arched element is curved (like a parabola) to maximize a cushioning effect. In conjunction with this, the lock lever 78 contact surface is shaped such that (starting from the lock lever's initial position) the distance from the point of contact to the center of rotation (contact radius) increases, which translates into a compound cushioning effect due to the unique shape and motion of both surfaces.

Whenever the push button 64 is in the locked position or the latched position, the spool 22 may still rotate in a direction that causes the tether 26 to retract back into the housing 12 and be wound about the spool 22 if the leaf spring 40 has sufficient bias. This is so because the back side of each tooth 28 is ramped and the front surface 92 of the head 86 of the lock lever 78 is rounded allowing the teeth 28 to pass past the lock lever 78 by pushing the lock lever 78 up out of the way. The push button spring 74 has sufficient compression room left in order to allow such movement of the lock lever 78 despite the outer wall 68 of the push button 64 being biased against the lip 118 of the housing 12.

In order to adjust the bias of the leaf spring 40, the user pushes on the adjustment knob 46 until the ramps 58 of the adjustment knob 46 are clear of their ramp receivers 62. The adjustment knob 46 is rotated or counter-rotated via the finger grip 56 in order to either further coil the leaf spring 40 or lesser the coil of the leaf spring 40 respectively. Once the desired tension is placed onto the leaf spring 40, the adjustment knob 46 is released causing the ramps to once again seat within their respective ramp receivers 62 on the cover 14 via the bias of the coil spring 44.

The various components of the retractable leashing with gradual braking 10 can be made from any appropriate material, such as plastic, light metal, or a combination thereof, with the various springs advantageously, though not necessarily, being made of metal While the invention has been particularly shown and described with reference to an embodiment thereof, it will be appreciated by those skilled in the art that various changes in form and detail may be made without departing from the spirit and scope of the invention.

We claim:

1. A retractable leash comprising:
   a leash housing;
   a spool rotatably disposed within the housing;
   a lock lever pivotally disposed within the housing, the lock lever articulates between a normally relaxed first position wherein the lock lever is disengaged from the spool and a second position wherein the lock lever is engaged with the spool and prevents the spool from rotation but permits spool counter-rotation;
   a friction element having an arcuate lower end, the friction element disposed within the housing;
   an engagement cam having a base and a top and a central opening therebetween such that the engagement cam straddles the friction element such that the friction element is located within the central opening and such that the engagement element articulates between a normally relaxed third position wherein a top end of the friction element abuts the top of the engagement cam and a fourth position wherein the base of the engagement cam abuts a rounded bottom of the friction element and such that when the lock lever is in the first position, the engagement cam is in the third position and as the lock lever articulates toward the second position, the lock lever urges the engagement cam toward the fourth position and as the lock lever returns back toward the first position, the engagement cam returns, in lockstep, back toward the third position;

a tether wound about the spool, the tether paid out through an opening on the housing; and wherein the tether passes through the engagement cam such that when the lock lever is in the first position and the engagement cam is in the third position, the tether passes along the base of the engagement cam and as the lock lever is moved toward the second position, thereby urging the engagement cam toward the fourth position, the base moves a portion of the tether into frictional engagement with the bottom of the friction element, the frictional engagement increasing as the engagement cam moves toward the fourth position and with decreasing frictional engagement as the engagement cam moves toward the third position and with the tether disengaged from the friction element whenever the engagement cam is in the third position.

2. The retractable leash as in claim 1 further comprising a spring attached to the spool and to the housing in order to spring-load the spool so that pay out of the tether from the housing operates against the bias of the spring, thereby allowing automatic retraction of the tether back onto the spool via the spring-loading.

3. The retractable leash as in claim 2 wherein the spring constant is adjustable.

4. The retractable leash as in claim 1 wherein a spring-loaded button is disposed within housing and abuts the lock lever such that button articulates between a normally relaxed fifth position wherein the lock lever is in the first position and a sixth position wherein the button urges the lock lever into the second position such that the spring-loading of the button attempts to urge the button toward the fifth position.

5. The retractable leash as in claim 4 further comprising a stop disposed within the housing such that the button is removably placed against the stop in order to hold the button in the sixth position against the spring-loading of the button.

6. The retractable leash as in claim 1 further comprising a plurality of equidistantly spaced teeth located on an outer surface of the spool and arranged in a circle, such that each tooth has a first side with a one-way ramped surface and a second side with a stop surface such that whenever the spool is rotating in the direction of tether pay out, the second side of each tooth is the leading edge and such that whenever the lock lever is in the second position, the lock lever engages the second side of one of the teeth and thereby prevents the rotation of the spool in a tether pay out direction, yet when the spool rotates in a counter direction, the lock lever rides overtop the first side of each tooth.

7. The retractable leash as in claim 6 wherein a spring-loaded button is disposed within housing and abuts the lock lever such that button articulates between a normally relaxed fifth position wherein the lock lever is in the first position and a sixth position wherein the button urges the lock lever into the second position such that the spring-loading of the button attempts to urge the button toward the fifth position.

8. The retractable leash as in claim 7 further comprising a stop disposed within the housing such that the button is removably placed against the stop in order to hold the button in the sixth position against the spring-loading of the button.

9. The retractable leash as in claim 1 wherein the base has a pair of ends and a curved medial portion that curves away from the friction element and such that the shape of the medial portion of the base corresponds to the shape of the lower end of the curved element and receives the curved element whenever the engagement cam is in the sixth position.

10. The retractable leash as in claim 1 wherein the housing has a handle.

* * * * *